United States Patent [19]
McNeel et al.

[11] Patent Number: 5,878,001
[45] Date of Patent: Mar. 2, 1999

[54] REPAIRABLE WATERPROOF GEOPHONE HOUSING

[75] Inventors: William O. McNeel; Leo Patrick Murphy; Gary Dwayne Freeman, all of Houston, Tex.

[73] Assignee: GEO Space Corporation, Houston, Tex.

[21] Appl. No.: 47,691

[22] Filed: Mar. 25, 1998

[51] Int. Cl.$^6$ .............................. H04R 23/00; G01V 1/16
[52] U.S. Cl. .......................... 367/188; 367/178; 181/122
[58] Field of Search ............................. 367/15, 188, 178; 181/122, 401

[56] References Cited

U.S. PATENT DOCUMENTS

| | | | |
|---|---|---|---|
| 3,931,453 | 1/1976 | Hall, Jr. ................................ | 174/65 R |
| 4,122,433 | 10/1978 | McNeel ................................... | 367/188 |
| 4,438,292 | 3/1984 | Woodall ................................. | 367/188 |
| 4,470,134 | 9/1984 | McNeel et al. ........................ | 367/188 |
| 5,014,813 | 5/1991 | Fussell ................................... | 181/122 |
| 5,757,729 | 5/1998 | Cheema ................................. | 367/188 |

*Primary Examiner*—Ian J. Lobo
*Attorney, Agent, or Firm*—Fulbright & Jaworski

[57] ABSTRACT

A repairable geophone housing having a fully molded waterproof one piece upper body which is seabably and releasably connectible to a lower body. All surfaces within the upper body are bonded to prevent moisture entering and the geophone transducer may be replaced if desired.

6 Claims, 5 Drawing Sheets

REPAIRABLE WATERPROOF GEOPHONE HOUSING

FIELD OF THE INVENTION

This invention, relates to, and provides a means of improvement in a geophone housing or marsh case assembly in that it incorporates a fully molded one piece upper body with a hard, rigid body and an exceptionally flexible cable seal and external exciting cable bend limited to provide a waterproof enclosure. All surfaces and interfaces within the upper body, when molded, presents confronting surfaces that are totally molecular bonded which prevents moisture from entering within. The electrical cable takeout which extends from the geophone transducer through the upper body and upwardly out through the flexible cable seal and bend limiter excludes all paths for water migration. A lower body internally houses the geophone transducer and is attached to the upper body and sealed with O rings to ensure against water from entering within. A housing of this design allows for the geophone transducer to be replaced if required.

BACKGROUND OF THE INVENTION

In swamps, wetlands, marshes and shallow bays, geophones encased in special geophone housings or marsh cases are used in seismic exploration surveys. Marsh cases in general consist of an upper and lower body with the geophone transducer sealed within. The lower end usually houses the geophone transducer and has a tapered end cone or spike to facilitate the insertion of the element into the muddy surface bottom. The upper end of the case has an electrical cable entry area through which some form of cable seal is accomplished. The conductors in the electrical cable are attached to the internally housed geophone transducer and conduct the electrical signals to a recording device through interconnecting cables. The cable entry area must be sealed to prevent moisture from entering within. The upper end of the housing or marsh case is designed to be accepted by a planting attachment on the end of a pole so that the marsh case can firmly be implanted into the surface bottom.

After the survey operations have been completed at a given location, the geophone housing is recovered beneath the muddy surface bottom by pulling on the cable. For prior art, see U.S. Pat. No. 3,931,453 and U.S. Pat. No. 4,470,134. Either of these cases, mentioned in the above patents, do not exclude moisture if the electrical cable outer jacket is cut though, and into the internal conductor's insulation. Water can migrate down the conductors and penetrate into the cavity housing the geophone transducer element causing electrical leakage, or possible short circuit conditions. U.S. Pat. No. 5,014,813 provides a waterproof housing, but is non-repairable if damage occurs to the geophone transducer for any reason. Nor does this design allow for the replacement of the transducer when desired.

This invention provides the latest improvements of a repairable marsh case design or geophone housing that provides a rugged structure which is not subject to leakage during harsh field usage or handling.

SUMMARY OF THE INVENTION

An improved geophone housing of this invention includes a fully molded marsh case housing assembly with improved methods of molding to make said housing totally waterproof. A top body of the housing consists of an internal water block which receives the two electrical conductors from an electrical cable which are soldered to a terminal board. The terminal board is pressed into a potting cup and filled with an epoxy mixture that provides a rigid encapsulation of the wires behind the terminal board. The water block cup is comprised of an injection molded, hard, rigid, non-conductive, glass filled urethane material. The takeout electrical cable jacketed insulation is generally an extruded, soft urethane material. The takeout electrical cable jacketed insulation is generally an extruded, soft urethane material which satisfactorily forms a seal bond around the electrical cable conductors. A seal gland, preferably formed of a compatible injection moldable, resilient, low durometer urethane material, is molded directly to the electric cable jacket and to the back side of the water block cylindrical cup forming a one piece molecular bonded watertight assembly.

A top cap comprised of an injection molded hard, rigid, nonconductive, glass filled urethane material is slipped over and down the electrical cable and engages the molded seal gland and water block assembly. This assembly is placed into a mold and an over shot of compatible molded material comprised of hard, rigid, non-conductive, glass filed urethane is molded to the top cap and the extended urethane seal gland which projects externally. This over shot of urethane material molecularly bonds all parts together. In this configuration the water block and seal gland assembly abutting the internal counterbores of the top cap provided an excellent cable anchor. The geophone transducer is housed within the cavity of the lower body. Conductor wires are electrically connected to the terminals of the geophone transducer and extend upwardly and are terminated to the terminal board of the water block and terminated electrically with solder.

The lower body is releasably attached to the upper body and locked firmly in place with a retainer ring formed of stainless steel. Sealing rings are provided to guarantee a waterproof assembly between the upper body and the inner cavity of the lower body.

Other and further objects, features and advantages will be apparent from the following description of a present preferred embodiment of the invention, given for the purpose of disclosure and taken in conjunction with the accompanying drawings.

DESCRIPTION OF THE PREFERRED EMBODIMENT

Figure 1:
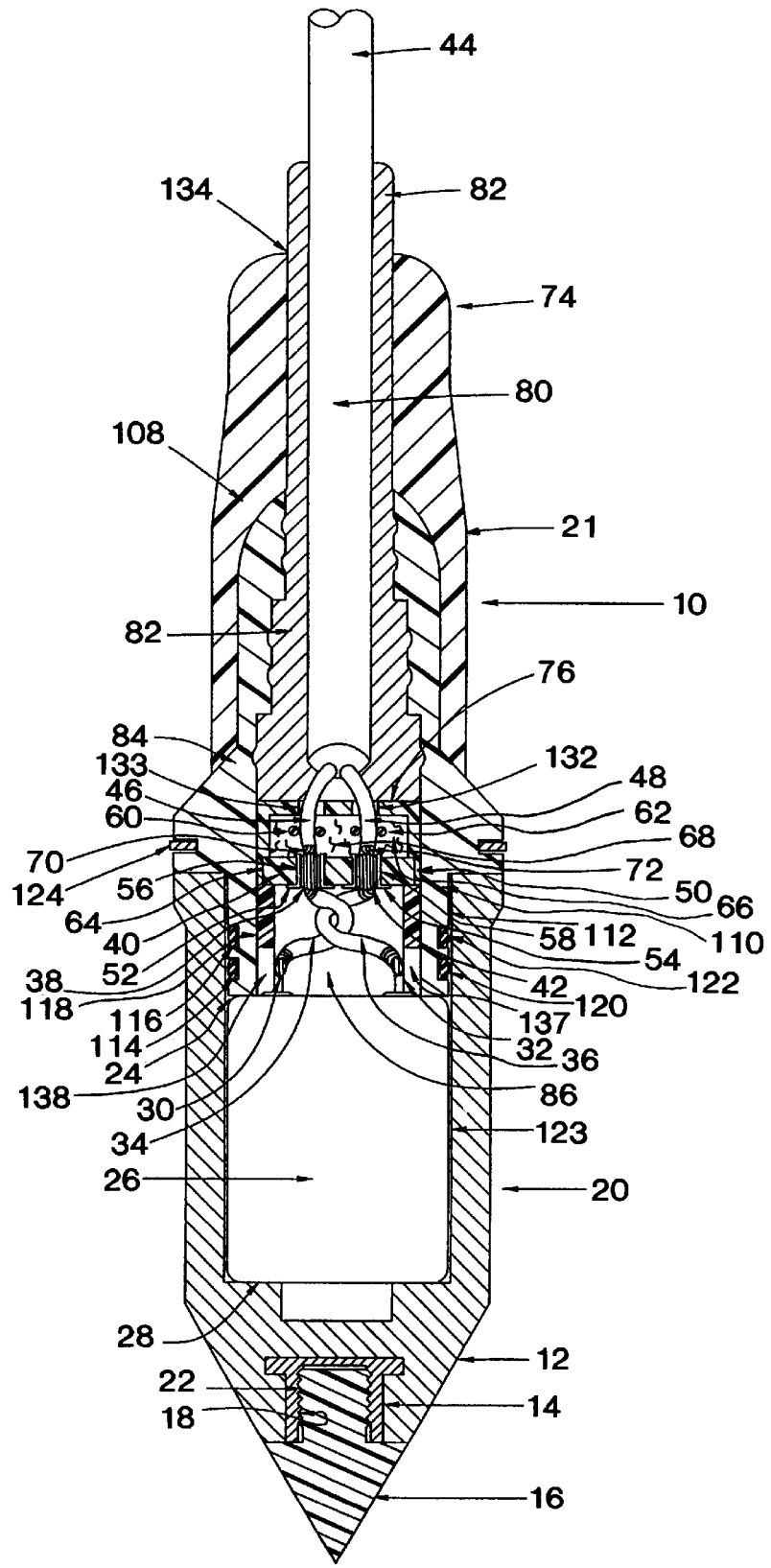
FIG. 1 is an elevational view, in cross section, of the preferred embodiment of the present invention, in an assembled relationship.
Figure 5:
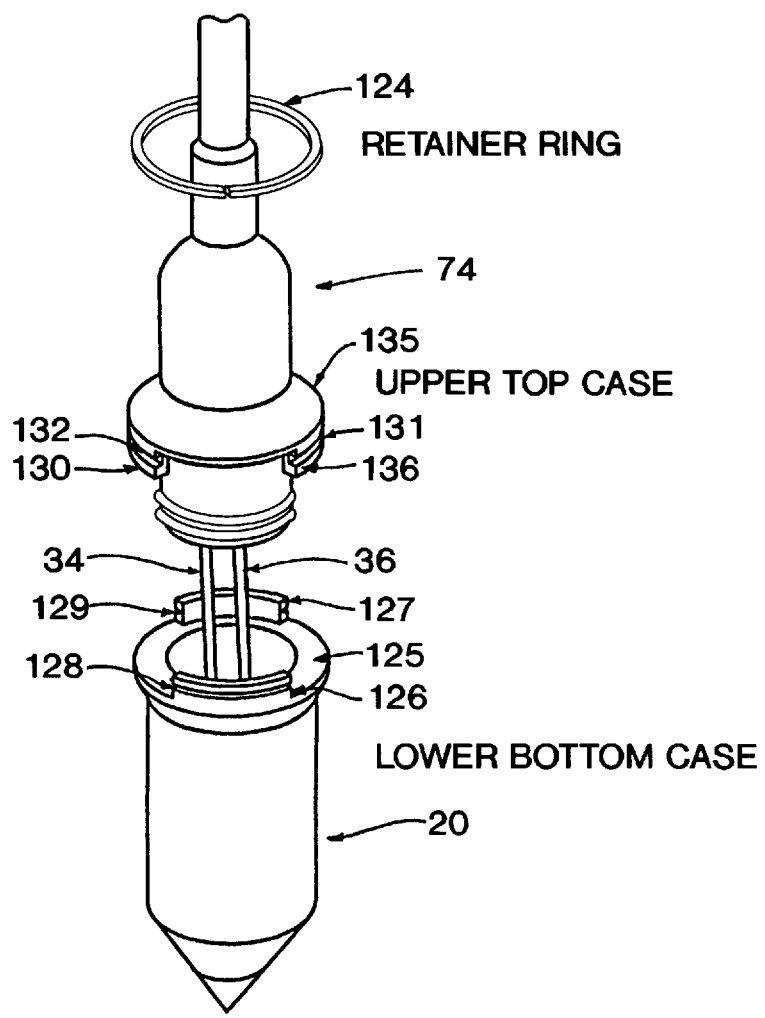
FIG. 5 is a perspective exploded, elevational view of the upper body and lower body in an unassembled relationship.

Referring now to the drawings, and particularly to FIGS. 1 and 5, the reference numeral 10 generally relates to the repairable waterproof geophone housing or marsh case assembly of the present invention and includes a lower body 20 and an upper body 21 in which the lower body 20 and the upper body 21 are releasably and sealably connected to each other.

Preferably, the lower body 20 is comprised of an injection molded hard, rigid, non-conductive, glass urethane body that is formed with a tapered end section 12. Molded within the tapered end section 12 is a threaded female insert 14 preferably machined from brass or other suitable material which accepts a spike 16, in a threaded engagement. The spike can vary in length to three inches or more. The threaded section 18 of the spike 16 engages the threaded section 22 of the female insert 14 and is tightened securely, A cylindrical, open top cavity 24 is provided within the lower body 20 which accepts the geophone transducer 26 which seats on the bottom surface 28. The geophone 26 has a positive terminal 30 and a negative terminal 32 which are connected to electrical insulated conductor wires 34 and 36. Conductors wires 34 and 36 are of sufficient length to allow assembly.

Figure 2:
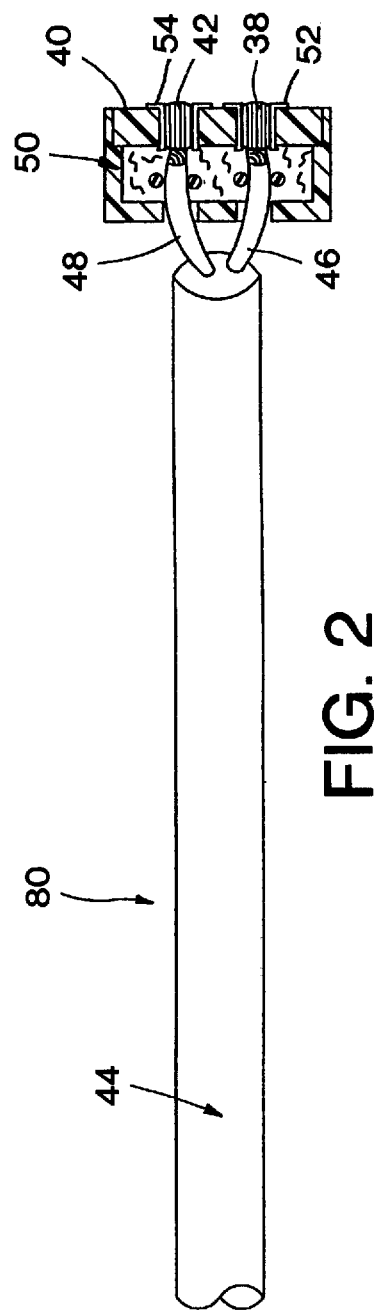
FIG. 2 is an elevational view, in cross section, showing the connection of a water block cup to the cable.

Referring now to FIGS. 1 and 2, the upper body 21 includes an electrical cable 44 which houses two electrical insulated wires 46 and 48 that are inserted through holes 132 and 133 of a cylindrical water block cup 50 and terminated electrically, with solder, to the positive terminal 38 and negative terminal 42 of terminal board 40. Eyelets 52 and 54, preferably made of brass or other suitable material are crimped within the two holes 56 and 58 to form a solder receptacle in terminal board 40 to allow the electrical wires 34 and 36, from geophone 26, to be electrically connected to the electrical insulated conductor wires 46 and 48 of the electrical cable 44. The cylindrical water block cup 50 and water block terminal board 40 are comprised preferably of an injection molded hard, rigid, non-conductive glass filled urethane material. O-rings 60 and 62 may be inserted over the conductors 46 and 48 to prevent any moisture from passing through to the electrical connections 38 and 42 if the electrical cable 44 jacket is cut and water or moisture travels down the insulated jacket of the conductors 46 and 48 and attempts to enter within water block 50. The water block terminal board 40 is pressed into a counterbore 64 of the water block cup 50 which seals the cavity 66. Cavity 66 is filled with a rigid urethane epoxy 68 or a similar material that is compatible with and bonds to the water block cup 50 and terminal board 40. If the electrical cable 44 outer jacket is cut through and down to the metal conductor wires 70 and 72 of the insulated conductors 46 and 48 the epoxy 68 will prevent the moisture migration from entering within cavity 66.

Figure 3:
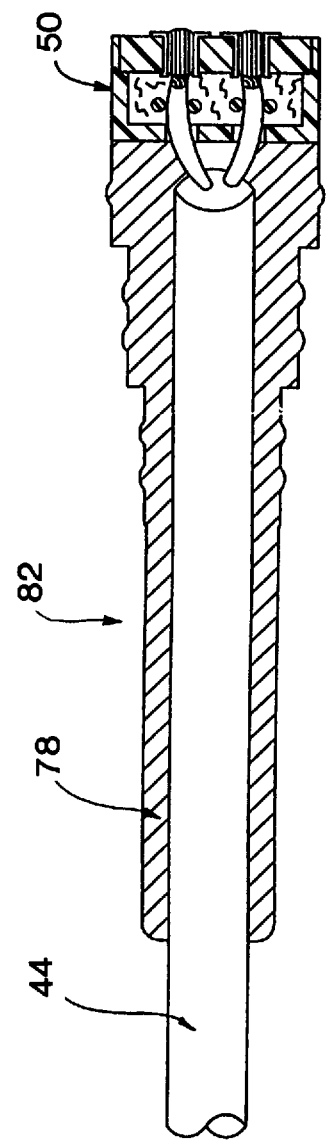
FIG. 3 is an elevational view in cross section, of the apparatus of FIG. 2 with the addition of a molded seal gland.
Figure 4:
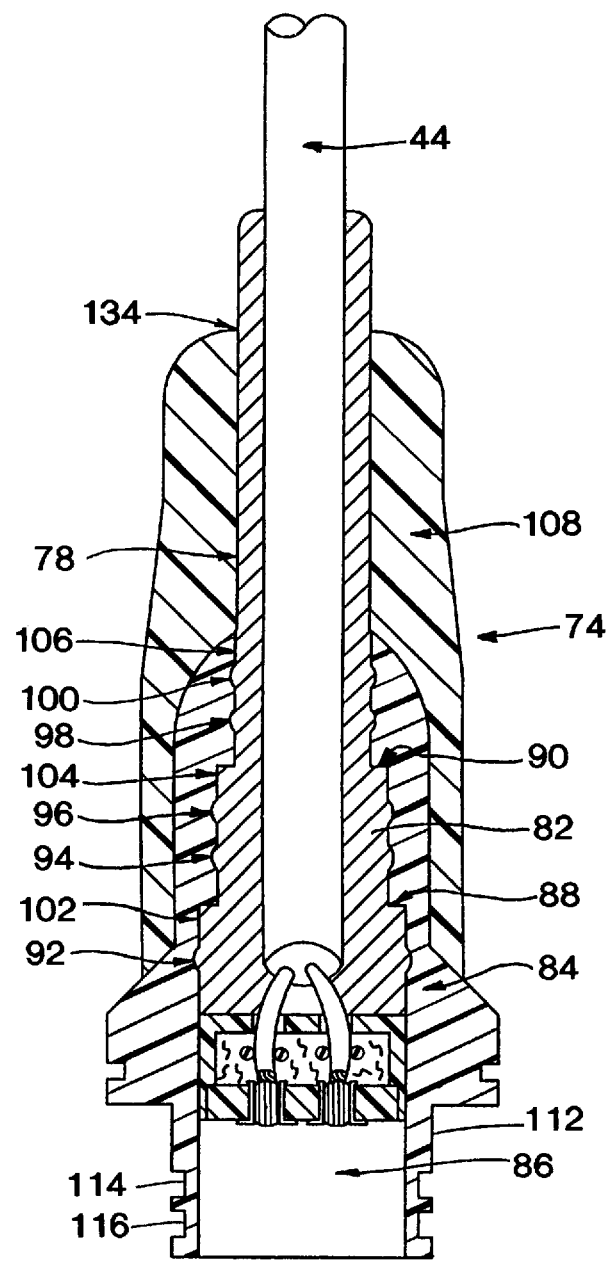
FIG. 4 is an elevational view, in cross section, of FIG. 3 with the addition of a top cap and an overshot.

Referring now to FIGS. 1, 3 and 4, after the connection of the water block 50 to the cable 44, a molded, urethane seal gland 78 which acts as a flexible cable seal as well as bend limiter is affixed to the cable 44 and the water block 50. The seal gland 78 which abuts to the back surface 76 of water block 50 is preferable a flexible, 85 durometer urethane that is compatible with the material of the water block 50. The material of seal gland 78 is compatible with the extruded urethane jacket of the electrical cable 44 and bonds over its length and periphery. As shown in FIG. 4 the assembly 82 is inserted through the cavity 86 and is positioned on shoulder 88 and 90 of a top cap 84 and extends outwardly through the opening 134. The top cap 84 preferably is comprised of an injection molded hard, rigid, non-conductive, glass filled urethane material. O-rings 92, 94, 96, 98 and 100 of the seal gland 78 are in a compression fit with the cavity 86 inner walls 102, 104 and 106. Overshot 108 preferably is comprised of an injection molded hard, rigid, non-conductive, glass filled urethane material which is compatible with all other materials of the top cap 74. The overshot 108 molecularly bonds to the top cap 84 and to the seal gland 78, and the seal gland 78 bonds to the electrical cable 44 and abuts to and bonds with the back surface 76 of the water block 50 thus completing a one piece molecular bond of the top cap 74. It is to be noted that the seal gland 78 preferably includes a series of a plurality of reduced diameter exterior surfaces extending through the top of the upper body 21 and extends out of the overshot 108 to provide a seal and a bend limiter so that the cable 44 may be bent against a soft flexible material which is less likely to damage the cable 44 than a harder material.

The lower portion 110 of the top cap 74 has a reduced diameter outer surface 112 that is formed with a plurality of external O-ring grooves 114 and 116. Prior to electrically connecting the geophone terminals 30 and 32 to the electrical conductor wires 34 and 36, spacer 118 is positioned within the cavity 86 and abuts to the face of the water block terminal board 40. O-rings 120 and 122 are positioned in O-ring grooves 114 and 116 and are in a compression fit with the inner wall 123 within the cavity 24 of the lower case body 20. O-rings 120 and 122 seal the cavity 24 and excludes moisture when lower case bottom 20 and upper top cap 74 are assembled together.

As shown in FIG. 5, the lower body 20 upwardly engages the upper top cap 74 of upper body 21 and they are locked in a sealing engagement with a circular metal retainer ring 124 preferably fabricated from stainless steel or other suitable material. The lower body 20 has an upper increased diameter flange 125 with two upwardly projection segmented shoulders 126 and 127 with outwardly projected retainer ring grooves 128 and 129 so positioned to accept retainer ring 124.

The upper top cap 74 lower body has an increased diameter flange 135 and two downwardly projected segmented shoulders 130 and 136 with outwardly projected retainer ring grooves 131 and 132. Shoulder of upper case top 130 and 136 are aligned at 90 degrees relative to the shoulders 126 and 127 of the lower case bottom 20. The geophone transducer terminals 30 and 32 are attached electrically to the insulated conductor wires 34 and 36 and similarly attached electrically to terminals 38 and 42 of the water block terminal board 40. The insulated conductor wires 34 and 36, lengthen to facilitate the wiring techniques, are twisted together to shorten their length when assembled and are projected upwardly into the spacer 118 in cavity 86. Geophone transducer 26 is in abutment with spacer 118. Spacer 118 has cut out rectangular segments 137 and 138 to provide clearance for the geophone terminals 30 and 32.

The shoulder 126 and 127 of the lower case bottom 20 projects upwardly in a 90 degree alignment with the upper top cap 74 shoulders 130 and 136 which project downwardly and are received together in an engagement like manner. Retainer ring 124 engages O-rings grooves 128, 129, 131 and 132 firmly locking the upper top cap 74 and lower case bottom 20 together.

The advantages of this invention are now apparent. A fully molded marsh case assembly or geophone housing is provided with a rigid body having a center flexible cable bend limiter exiting at the top of the assembly, all of which are molecular bonded throughout providing a waterproof, moisture restrictive enclosure.

The geophone transducer is easily replacement, in the field environment, which may be necessitated due to transducer model change, high voltage damage, or a frequency, sensitivity or coil impedance change at the client's request.

Thus, it can easily be seen by those knowledgeable in the arts that this new invention solves one of the most serious problems of marsh case water intrusion encountered when working geophysical surveys in the water environment.

The present invention, therefore, is well adapted to carry out the objects and attain the ends and advantages mentioned as well as others inherent therein. While a presently preferred embodiment of the invention has been given for the purpose of disclosure, numerous changes in the details of construction, arrangement of parts will be readily apparent to those skilled in the art and which are encompassed within the spirit of the invention and the scope of the appended claims.

What is claimed is:

1. A repairable waterproof geophone housing comprising, a housing including a lower body and an upper body, said lower and upper body being releasably and sealably connected to each other, said lower body including a cavity for holding a geophone transducer, said upper body connected to an electrical cable and comprising a water block cup including electrical terminals, a seal gland, a top cap, and an overshot, said cable including electrical conductors extending into the water block cup and connected to the terminals and said terminals electrically connected to the transducer, said water block cup being filled with a rigid plastic seal surrounding the electrical conductors, said seal gland being a flexible plastic material abutting the cap and surrounding the cable, said top cap being a rigid plastic material surrounding the water block cup and a portion of the seal gland, said overshot being a rigid plastic material surrounding a portion of the top cap and the seal gland, and said overshot is bonded to the top cap and the seal gland, the seal gland is bonded to the electrical cable and the water block cup whereby the upper body forms a one-piece molecular bonded waterproof body.

2. The apparatus of claim 1 wherein the seal gland extends out of the overshot surrounding the electrical cable forming a flexible bend limiter.

3. The apparatus of claim 2 wherein the seal gland incudes in series a plurality of reduced diameter exterior surfaces extending towards the top of the upper body.

4. The apparatus of claim 3 wherein the exterior of the seal gland includes a plurality of seal rings engaging the interior of the top cap.

5. The apparatus of claim 1 wherein the water block cup includes a seal ring around each electrical conductor.

6. The apparatus of claim 1 wherein the water block cup is filled with epoxy.

* * * * *